United States Patent
Starkova et al.

(10) Patent No.: US 12,234,151 B2
(45) Date of Patent: Feb. 25, 2025

(54) METHOD FOR PRODUCING GRAPHENE AND NEW FORM OF GRAPHENE

(71) Applicant: Graphene Star Ltd, Twickenham (GB)

(72) Inventors: Marina Starkova, Twickenham (GB); Sergey Alekseev, London (GB)

(73) Assignee: Graphene Star Ltd, Twickenham (GB)

( * ) Notice: Subject to any disclaimer, the term of this patent is extended or adjusted under 35 U.S.C. 154(b) by 0 days.

(21) Appl. No.: 17/608,415

(22) PCT Filed: May 10, 2019

(86) PCT No.: PCT/EP2019/062101
§ 371 (c)(1),
(2) Date: Nov. 2, 2021

(87) PCT Pub. No.: WO2020/228931
PCT Pub. Date: Nov. 19, 2020

(65) Prior Publication Data
US 2022/0227632 A1  Jul. 21, 2022

(51) Int. Cl.
*C01B 32/19* (2017.01)
*B01J 19/00* (2006.01)
(Continued)

(52) U.S. Cl.
CPC ............ *C01B 32/19* (2017.08); *B01J 19/008* (2013.01); *B01J 19/241* (2013.01); *B01J 19/26* (2013.01);
(Continued)

(58) Field of Classification Search
CPC . C01B 32/19; C01B 2204/04; C01B 2204/22; C01B 2204/30; C01B 2204/32;
(Continued)

(56) References Cited

U.S. PATENT DOCUMENTS

| | | | |
|---|---|---|---|
| 7,594,614 B2 | 9/2009 | Viyay et al. | |
| 2002/0054995 A1 | 5/2002 | Mazurkiewicz | |

(Continued)

FOREIGN PATENT DOCUMENTS

| | | |
|---|---|---|
| CN | 102381701 A | 3/2012 |
| CN | 103539103 B | 1/2014 |

(Continued)

OTHER PUBLICATIONS

English machine translation of CN105776193A (2016).*
(Continued)

*Primary Examiner* — Richard M Rump
(74) *Attorney, Agent, or Firm* — WESTMAN CHAMPLIN & KOEHLER, P.A.; Z. Peter Sawicki; Amanda M. Prose

(57) ABSTRACT

The invention provides a method for preparing graphene which method comprises the steps of: (a) forming a graphite/water mixture; and (b) introducing the graphite/water mixture into a cavitation reactor using at least two offset nozzles; a cavitation reactor for use in the method wherein the cavitation reactor has a cavitation chamber wherein the cavitation chamber has at least two offset inlet nozzles which are directed towards the centre of the cavitation chamber and at least one outlet; and graphene having a carbon content of at least about 98 wt %.

12 Claims, 3 Drawing Sheets

(51) Int. Cl.
*B01J 19/24* (2006.01)
*B01J 19/26* (2006.01)

(52) U.S. Cl.
CPC ...... *C01B 2204/04* (2013.01); *C01B 2204/22* (2013.01); *C01B 2204/30* (2013.01); *C01B 2204/32* (2013.01); *C01P 2002/82* (2013.01)

(58) Field of Classification Search
CPC ........ B01J 19/008; B01J 19/241; B01J 19/26; C01P 2002/82
See application file for complete search history.

(56) References Cited

U.S. PATENT DOCUMENTS

| | | | |
|---|---|---|---|
| 2003/0199595 | A1 | 10/2003 | Kozyuk |
| 2016/0280551 | A1* | 9/2016 | Hasegawa ............. B02C 19/061 |
| 2017/0327379 | A1 | 11/2017 | Ghimire et al. |
| 2018/0009667 | A1* | 1/2018 | Yan ....................... C01B 32/182 |

FOREIGN PATENT DOCUMENTS

| | | |
|---|---|---|
| CN | 103072982 B | 2/2015 |
| CN | 105000542 A | 10/2015 |
| CN | 105731436 A | 7/2016 |
| CN | 105776193 A | 7/2016 |
| CN | 106115666 A | 11/2016 |
| CN | 106976871 A | 7/2017 |
| CN | 107343374 A | 11/2017 |
| EP | 3266744 A1 | 1/2018 |
| WO | 96/14141 A1 | 5/1996 |
| WO | 2018/105570 A | 6/2018 |
| WO | 2018/183518 A1 | 10/2018 |

OTHER PUBLICATIONS

Shen, Z. et al. "Preparation of graphene by jet cavitation" Nanotechnology 22 (2011) 365306.
International Search Report and Written Opinion issued for PCT/EP2019/062101, dated Apr. 12, 2019.
Search Report issued for GB patent application serial No. 1719036.4, dated Aug. 30, 2018.
Examination Report issued for GB patent application serial No. 1719036.4, dated Oct. 11, 2018.
Search Report issued for GB patent application serial No. 1719036.4, dated Oct. 11, 2018.
Examination Report issued for GB patent application serial No. 1719036.4, dated Feb. 1, 2019.

* cited by examiner

METHOD FOR PRODUCING GRAPHENE AND NEW FORM OF GRAPHENE

CROSS-REFERENCE TO RELATED APPLICATION

This Application is a Section 371 National Stage Application of International Application No. PCT/EP2019/062101, filed May 10, 2019 and published as WO 2020/228931 A1 on Nov. 19, 2020, in English, the contents of which are hereby incorporated by reference in their entirety.

The present invention relates to an improved form of graphene and a method for producing graphene using cavitation.

Graphene is a two-dimensional allotrope of carbon, formed by a layer of carbon atoms with a thickness of one atom in sp2-hybridization and bound in a hexagonal two-dimensional lattice. It can be represented as a single plane of graphite, separated from the bulk crystal. Graphene has high mechanical rigidity and high thermal conductivity. The high mobility of charge carriers (maximum electron mobility among all known materials) makes it a promising material for use in various applications, in particular as a future basis for nanoelectronics and possible replacement of silicon in integrated circuits.

Graphene also has important applications properties, such as chemical stability, exceptional strength and elasticity, impermeability to gases and almost complete optical transparency.

The commercial interest in graphene is due to its electronic properties: it is ballistic (no scattering) and its transport of electrons, the characteristics of which are the substrate and the environment influence is very weak. Features of the band structure of graphene allows for the existence of electrons and holes with zero effective mass, which are quasi-relativistic: behaviour described by the Dirac equation. Graphene shows an anomalous quantum Hall effect observable even at room temperature. Studies show that graphene is also a promising material for spintronics.

Properties of graphene can vary under the influence of chemical modification. The most reactive are the edges of graphene fragments. Full or partial functionalization of the entire fragment can be achieved. For example, graphene can be hydrogenated to graphane.

Graphene is inert with respect to acids and alkalis at room temperature due to the strong carbon covalent bonds. However, the presence of certain chemical compounds in the atmosphere can lead to doping of graphene, which has found application in sensors with the highest detecting sensitivity of individual molecules.

Currently, there are several ways to produce graphene materials in large volumes:
  a. Obtaining graphene oxide by oxidation of natural graphite with concentrated acids. The drawback of this method is that it is ecologically dangerous and there is a strong degree of contamination of the resulting graphene by acids. In addition, graphene plates obtained through this process have a huge number of defects.
  b. Obtaining graphene by intercalation of graphite with various acids and subsequent thermal shock. The disadvantages of this method are strong chemical pollution, derived graphene, large number of defects in the graphene plates, and thermos-deformation.
  c. Obtaining graphene by mechanical exfoliation of graphite in solvents or in water with addition of surfactants. The disadvantage of this method lies in the impact on the original graphite occurs as the separation of graphene plates, and the simple grinding of graphite to sub-micron sizes. The result is a mix of graphene plates and amorphous carbon, which is very difficult to separate. In addition, the pollution of graphene used solvents or surface-active substances.
  d. A method of producing graphene by low-temperature plasma. The main disadvantage of this method is the large number of defects in the obtained graphene and deformation of the graphene plates.

A way of ameliorating these problems has been sought.

According to the invention there is provided graphene having a carbon content of at least 98 wt %.

According to the invention there is also provided a method for preparing graphene which method comprises the steps of:
  a. Forming a graphite/water mixture; and
  b. Introducing the graphite/water mixture into a cavitation reactor using at least two offset nozzles.

According to the invention there is further provided a cavitation reactor for use in the method of the invention wherein the cavitation reactor has a cavitation chamber wherein the cavitation chamber has at least two offset inlet nozzles which are directed towards the centre of the cavitation chamber and at least one outlet.

It has surprisingly been found that the method of the invention ameliorates substantially all of the shortcomings of the above-described production methods of graphene:
  a. it is not necessary to use any chemicals or additives, which makes the process environmentally friendly and one-step.
  b. The method of the invention does not require any heating such that the method of the invention may take place at low temperature, for example to 50 degrees Celsius. This eliminates any kind of deformation of the resulting graphene plates.
  c. By using offset inlet nozzles, a tangential effect is created which means that there is no slip of the graphene plane. This substantially eliminates mechanical milling of graphite submicron to junk status.
  d. The absence of any chemical substances allows to obtain graphene plates without edge defects and with a high purity of carbon content—to 99.8%.

Further advantages of the invention include that neither ultrasound nor mechanical treatment is used to start the cavitation process in the mixture. The principle of the invention is based on the hydrodynamic interaction of two mixture flows with parameters that allow cavitation processing with high energy density at low frequencies. This method is applicable to many technological processes, but the goal of the authors of this invention was to obtain a cost-effective and highly efficient method for producing graphene plates. For this purpose, an original reactor was developed, where a powerful tangential action of the elastic medium occurs (this can be water, silicone oil, resins and various solvents) onto the initial graphite. Such a tangential effect on graphite leads to the graphene planes slipping off from graphite. This slippage is much easier than the separation of the graphene plate, which is explained by the electrodynamic nature of the interrelation of graphene plates in graphite. A further advantage of the invention is that the method results in an almost 100% conversion of the initial graphite into graphene plates In some embodiments, the graphene has an electrical conductivity of from 5000 S/m to 85000 S/m, e.g. from 16000 S/m or from 17000 S/m to 85000 S/m, for example from 20000 S/m to 85000 S/m, for example about 80000 S/m.

In some embodiments, the graphene may have a thickness of up to 2 nm, for example from 0.5 nm to 2 nm. In some embodiments, the thickness of the graphene may be determined by atomic force microscopy and/or Raman spectroscopy.

In some embodiments, the graphene may have a lateral size of up to 20 µm, for example from 1 to 20 µm. In some embodiments, the graphene comprises plates which have an average diameter which is determined by their lateral size. In some embodiments, the graphene may have a specific surface area (SSA) of about 180 m$^2$/g, for example from 100 to 300 m$^2$/g. In some embodiments, the graphene has a ratio of lateral size to thickness of up to 10000.

One of the parameters that determine the quality of graphene plates, is the electric conductivity. It is the reciprocal of specific resistance. Graphene plates have anisotropic conductivity: the electrical conductivity along the plates are orders of magnitude higher than the conductivity across the plates. Electrical conductivity is also significantly affected by the presence of plate defects and the ratio of lateral size of the plates to thickness. The higher the ratio of the lateral size of the graphene plate to the thickness, the higher the conductivity. The electrical conductivity of graphene measured by compressing the powder of graphene between copper cylindrical conductors. Pressed powder graphene can be represented as a system of conductors with anisotropic conductivity. In this system the important parameter is the quantity and quality of the resistive contacts between the graphene plates, that is, the more of these contacts, the higher total specific resistance and consequently lower conductivity. And if in this system, the graphene plates have defects or contamination, then the resistance between such plates will be much higher. Therefore, an indicator of high electrical conductivity of graphene powder is a consequence of purity and lack of defects in the graphene plates.

In some embodiments, the graphene may have a layer content from 1 to 10. In some embodiments, the graphene may have a high purity in carbon content with at least about 98 wt %, or 99 wt %, particularly 99.5 wt % or 99.7 wt % carbon. In some embodiments, the graphene may not have edge and structural defects, as determined by the Raman spectrum. In some embodiments, the graphene has an electrical conductivity of from 5000 S/m, for example from 16000 S/m, to 85000 S/m. It has surprisingly been found that the graphene according to the invention has a high electrical conductivity of up to 85000 S/m. In natural graphite this value is 16000 S/m, while in reduced graphene oxide (RGO), this value does not exceed 4000 S/m.

In some embodiments, the introduction of the graphite/water mixture is pulsed at a frequency of from 10-200 Hertz, for example 100 Hertz in step (b) of the method of the invention. The benefits of pulsing the introduction of the mixture include that the interaction between flows of the graphite/water mixture from the off-set nozzles is improved and that the cavitation effect is improved. It is believed that pulsation of the graphite/water mixture forms a cavitation low frequency field which helps the separation of the graphite into graphene sheets. In some embodiments, step (B) of the method of the invention is carried out at a temperature not exceeding 60° C., for example not exceeding 50° C., for example at room temperature such as a temperature from 10 to 30° C. or about 25° C.

In some embodiments, the graphite/water mixture may have weight ratio of from 5:95 to 50:50, for example from 10:90 to 40:60, for example about 10:90. In some embodiments, the method of the invention may include an additional step (c) of drying the graphene paste obtained. In some embodiments, step (c) may comprise drying the graphene paste by using micro-filtration.

In some embodiments, step (b) of the method of the invention comprises introducing counter streams of the water/graphite mixture using the at least two nozzles wherein the counter streams have substantially the same velocity and substantially the same pressure. It is believed that through interaction of the mixture counter streams, along the plane of graphite particles a tangential interaction occurs at high speed, up to 500 m/s. It is further believed that this interaction is accompanied by the formation of a cavitation field with a high density of energy, which converts water into a two-phase state with a low value of the friction of the water phases. In this case graphene plates do not break away from the graphite but slip off. Thus, complete stratification of the initial graphite takes place. In outward appearance the cavitation process resembles the process of a bubbly boiling liquid. And although the liquid itself does not heat up, it acquires properties of a boiling liquid. Such a liquid (particularly water) dissolves salts very well and disintegrates mineral substances thoroughly without destroying their natural structure. This change in the properties of the liquid is due to physical and chemical changes in its structure (formation of a homogeneous two-phase medium), the mechanism of which is triggered by cavitation, when the water goes into a so-called thermodynamically non-equilibrium state.

Without wishing to limit the invention to any particular scientific theory, it is believed that in the conditions of cavitation, the water/graphite liquid mixture acquires new qualities: when the pressure drops to the level of saturated vapor pressure, formation of vapor and gas voids occurs (the pressure drop also results in the release of gas previously dissolved in the liquid); the voids collapse as rapidly as they get formed. When the bubbles collapse, considerable energy is released. It has been experimentally established that the collapse of the steam bubbles forms intense cumulative jets (with a velocity of from 300 to 500 m/s), which, when colliding, generate a high-frequency oscillatory process and, as a result, sharp spot rises of pressure and temperature (up to 4000 MPa and 1000° C., respectively) occur.

The atomic plane in graphite is, in fact, a three-layered—a flat atomic frame is located between two layers of valence electrons. The effective electric charge in the valence bond "proton-electron" is not constant in time and equal to zero: it undergoes oscillations with a range from −e to +e (e is the elementary electric charge) and at frequencies whose distribution at thermal equilibrium corresponds to the equilibrium spectrum. As a result, the distribution of electric charges in the carbon atomic layer is not static: there are oscillations of the effective charge in the atomic frame itself and in the free valence bonds orthogonal to it. Without wishing to limit the invention to any particular scientific theory, it is believed that the model of electrodynamic retention of atomic layers in graphite elegantly explains the possibility of easy sliding of these layers along each other—which allows complete conversion of graphite into graphene. This is because for such an electrodynamic slide, there is no need to break any chemical bonds.

In some embodiments, the cavitation reactor may have one or more reflecting surface to help the formation of a cavitation field. For example, the cavitation reactor may have a cuboid form with up to four reflecting surfaces where each is positioned to cover a corner of the reactor.

The invention will now be illustrated with reference to the following Figures of the accompanying drawings which are not intended to limit the scope of the claimed invention:

Figure 1:
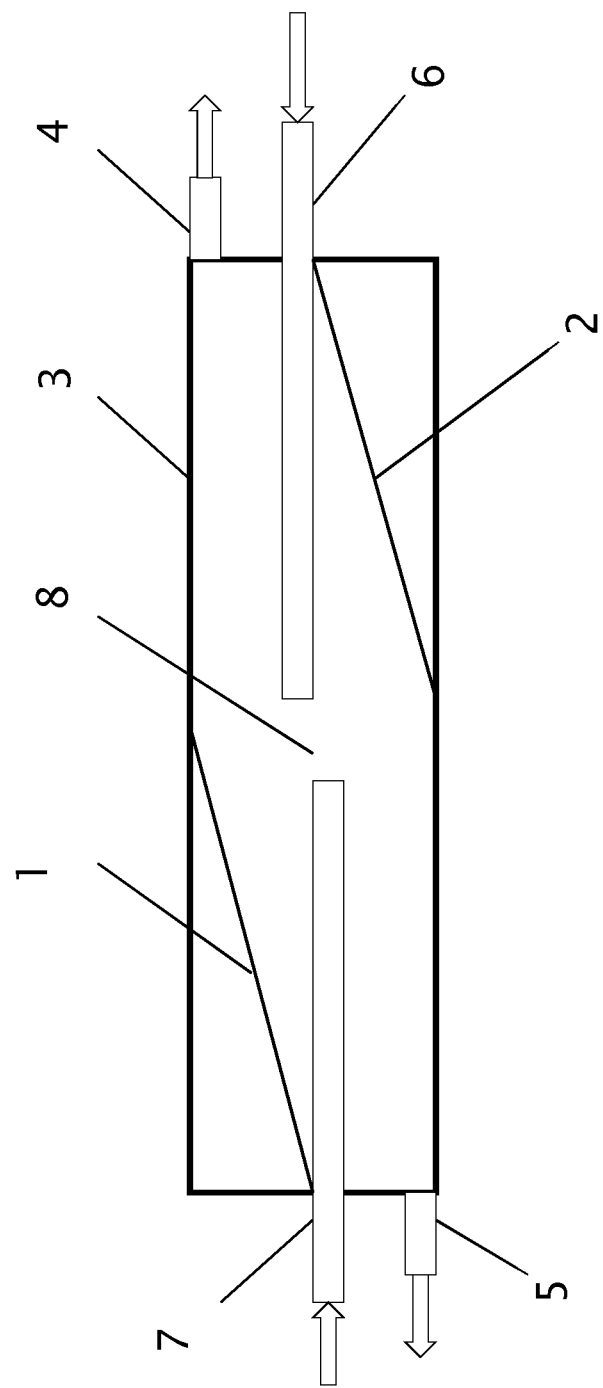
FIG. 1 shows a schematic cross-sectional view of a cavitation reactor according to the invention.

A reactor according to the invention is indicated generally at 10 on FIG. 1. Reactor 10 is in the form of an elongate cuboid sealed chamber 3 which has reflecting surfaces 1, 2, a cavitation void 8, inlet nozzles 6,7, and outlet nozzles 4,5. The inlet nozzles 6,7 are arranged towards the centre of the cavitation void 8 but are offset such that they are not coaxial. It has been found that this provides better conditions for the reaction. The outlet nozzles 4,5 are arranged in two of the corners of the cavitation void 8. The cavitation void 8 is formed by the sealed chamber 3 and the reflecting surfaces 1,2. The reflecting surfaces 1,2 are each arranged obliquely across diagonally opposing corners of the sealed chamber 3 such that reflecting surface 1 is arranged above inlet nozzle 7 and reflecting surface 2 is arranged below inlet nozzle 6. In an alternative embodiment, the reactor 10 may have one or two further reflecting surfaces 1,2 to cover the other two corners or vertices of the cavitation void 8.

The invention will now be illustrated with reference to the following Examples which are not intended to limit the scope of the claimed invention.

EXAMPLE

The following example illustrates how the reactor 10 can be used in the production of graphene.

A working solution, consisting of water and graphite with a weight ratio of 90:10, is fed through inlet nozzles 6,7 into the cavitation chamber 8 at a pressure of 15 MPa to 20 MPa and at a flow rate of 250 m/s. At the same time, the flow of the solution is pulsed at a frequency of 50-100 hertz.

As described above, the inlet nozzles are not aligned co-axially inside the reactor. This is required to create a collision of jets of the working solution in a tangential direction. The distance between the centres of the inlet nozzles 6,7 is equal to half the cross-sectional area of one jet:

$$s=G/2V$$

Where s represents the distance between the inlet nozzles 6 and 7; G is the total consumption of the mixture, l/min. V is the flow rate of the mixture from each inlet nozzle 6,7 in metres/second. The cross-sectional areas of typical jets which are suitable for use in the method of the invention are from 1.2 mm$^2$ to 10 mm$^2$. The typical distance between the jets is from 0.6 to 5 mm. The cross-sectional area of the jet and the distance between the jets are selected depending on the performance of the pumps and the particle size of the original graphite, which is used to produce graphene.

As a result of such a tangential interaction of the jets of the working solution from the inlet nozzles 6,7, cavitation starts in cavitation chamber 8. The energy flux density transferred to the mixture in cavitation chamber 8 is:

$$FD=W/s; \text{ or } FD=G*P/s,$$

where FD represents the energy flux density in W·m$^{-2}$; W represents the rate of consumption of energy in Watts; P is the total pressure in the nozzles in N/m$^2$. The pressure in the reactor is maintained at 0.2P. After the cavitational interaction, the resultant mixture flows out from the outlet nozzles 4,5. The direction of movement of the resultant mixture in the reactor is provided by the reflectors 1,2.

After processing in the reactor, the resultant mixture is dehydrated using micron-sized filters until a water-graphene paste with a graphene content of 20-40 wt % is obtained. The resulting paste is used in anode materials of lithium batteries with an aqueous binder as well as for the production of acrylic-based coatings to provide conductive and/or shielding properties. For other applications, the aqueous paste is dried to obtain a powder with a bulk density of 120-150 kg/m$^3$.

It should be noted that the method of the invention has ecological purity and is a safe process. This method does not use any chemicals or additives. The process takes place at a low temperature less than 60° C. Water after treatment of the mixture may be filtered and used repeatedly.

The graphene obtained was analysed and was found to have the following parameters:
a. Thickness—up to 2 nm;
b. Specific surface area (SSA)—180 m$^2$/g;
c. Lateral Size—up to 20 micron;
d. Electrical Conductivity—80000 S/m; and
f. Carbon—99.7 wt %.

The electrical conductivity of the graphene powder measured at a pressure of 500 Bar using a four points method at currents over 200 Amperes.

Figure 2:
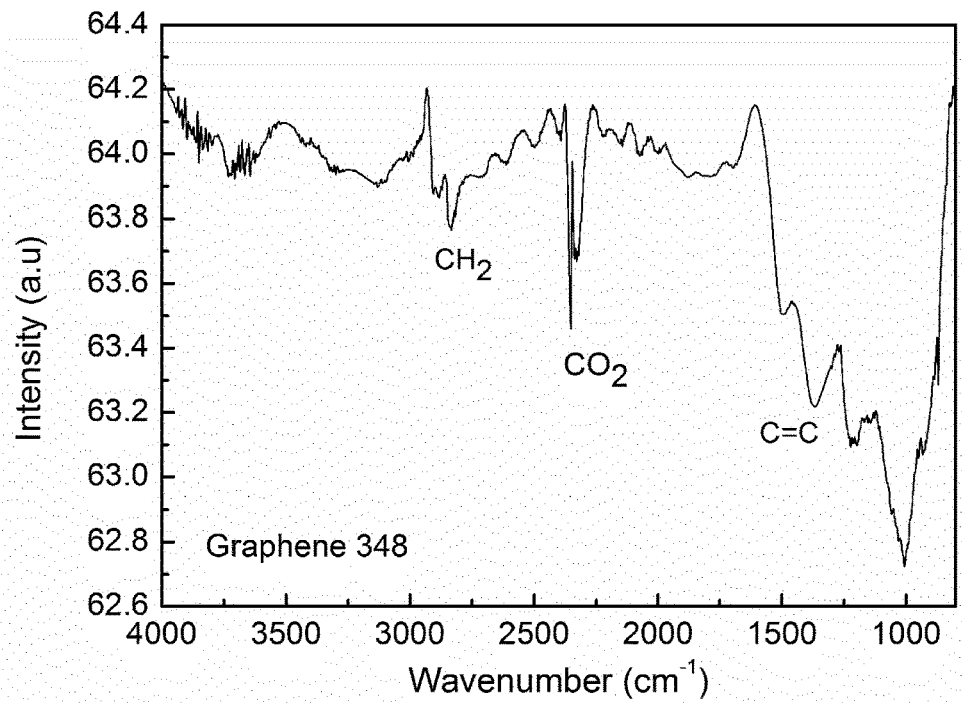
FIG. 2 shows a FTIR spectra for graphene according to the invention.
Figure 3:
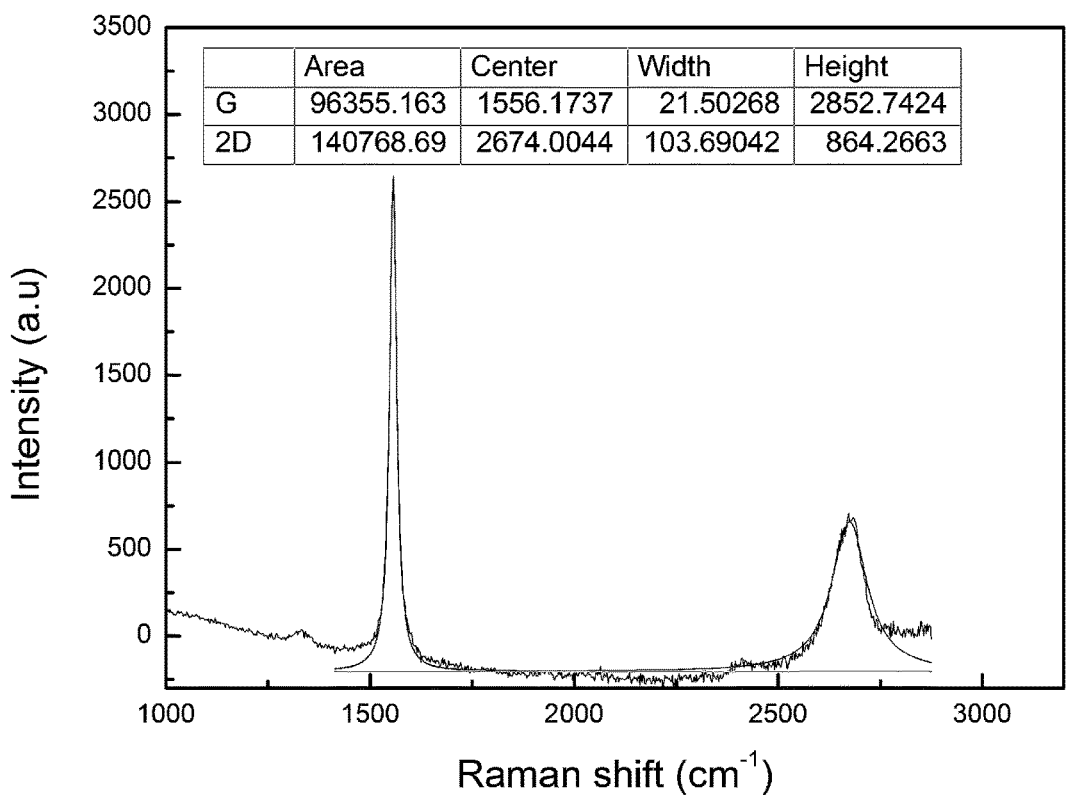
FIG. 3 shows a Raman spectra for graphene according to the invention.

The graphene obtained was analysed using FTIR and Raman spectra as shown in FIGS. 2 and 3. The FTIR spectra shows peaks for CH2, CO2 and C=C which show the purity and lack of contamination of the graphene. The Raman spectra is indicative of a lack of graphene defects and contaminants. The wave number data indicate that the sample had 1-2 graphene layers. In particular, in FIG. 3, the following bands are shown:
1350 sm$^{-1}$—D band
1556 sm$^{-1}$—G band
2674 sm$^{-1}$—2D band The $I_D/I_G$ ratio, which can be calculated from the intensity of peaks D and G on the Raman spectrum, indicates the presence of defects or the oxidation state of graphene. As can be seen from FIG. 3, the $I_D/I_G$ ratio is very small, indicating virtually no defects in the graphene prepared in the method according to the invention.

Figure 4:
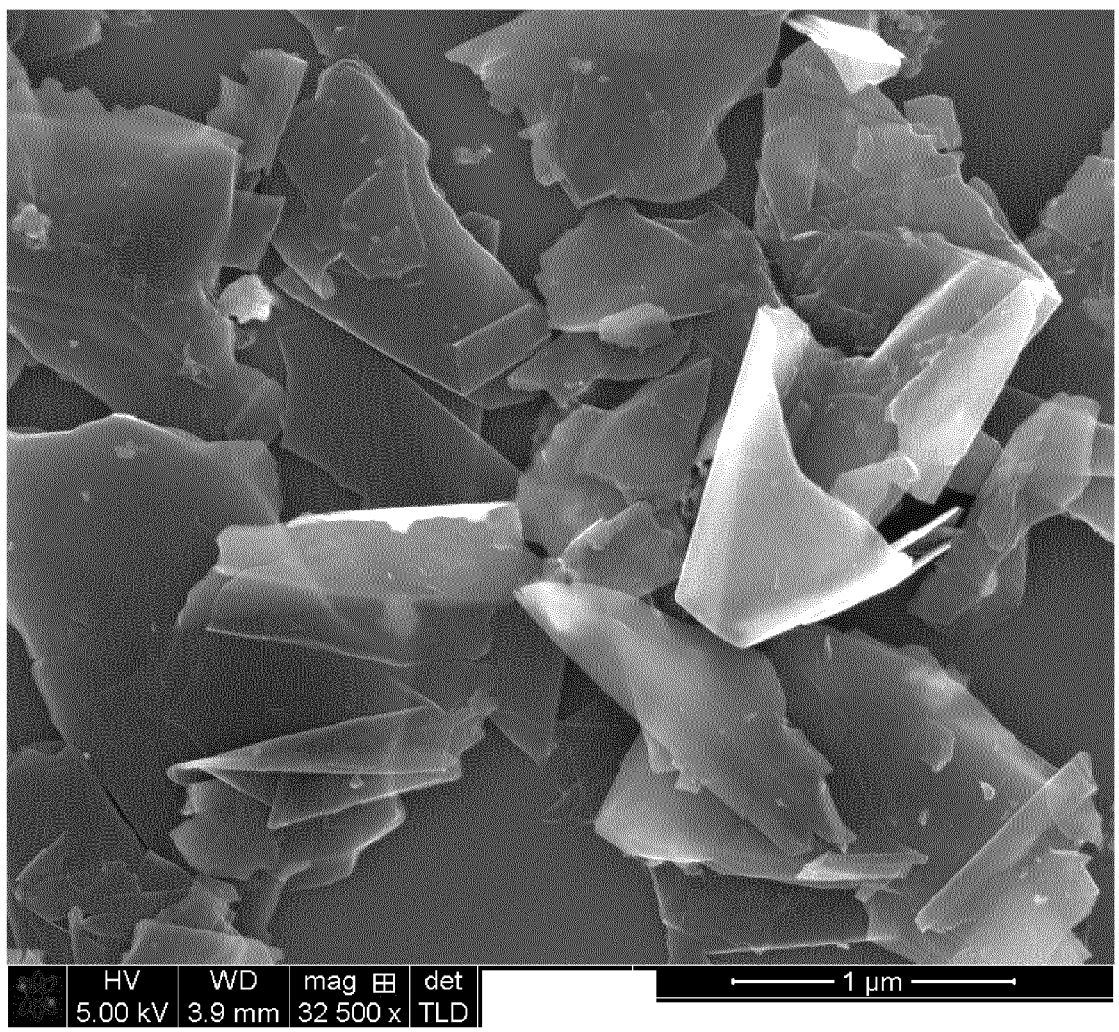
FIG. 4 shows a scanning electron microscope image of graphene platelets.

The graphene platelets obtained were imaged using a scanning electron microscope as shown in FIG. 4. The image shown in FIG. 4 shows flakes of graphene without impurities, having different thickness and showing no signs of heat deformation.

The invention claimed is:

1. A method for preparing graphene which method comprises the steps of:
   (a) forming a graphite/water mixture; and
   (b) introducing the graphite/water mixture into a cavitation reactor using at least two offset nozzles, wherein step (b) comprises pulsing the graphite/water mixture at a frequency of from 10-200 Hertz, wherein the offset nozzles are parallel but not coaxial.

2. The method as defined in claim 1 wherein step (b) is carried out at a temperature not exceeding 50° C.

3. The method as defined in claim 1 wherein step (b) comprises introducing counter streams of the water/graphite mixture using the at least two nozzles wherein the counter streams have substantially the same velocity and substantially the same pressure.

4. The method as defined in claim 1 which comprises a step (c) to dry the product of step (b).

5. The method as defined in claim 4 wherein the drying step (c) comprises use of micro-filtration.

6. The method as defined in claim 1 wherein the cavitation reactor has a cavitation chamber wherein the cavitation chamber has at least two offset inlet nozzles which are directed towards the centre of the cavitation chamber and at least one outlet.

7. A method for preparing graphene which method comprises the steps of:
   (a) forming a graphite/water mixture; and
   (b) introducing the graphite/water mixture into a cavitation reactor using at least two offset nozzles, wherein the offset nozzles are parallel but not coaxial.

8. The method as defined in claim 7 wherein step (b) comprises pulsing the graphite/water mixture at a frequency of from 50-100 Hertz.

9. The method as defined in claim 7 wherein step (b) is carried out at a temperature not exceeding 50° C.

10. The method as defined in claim 7 wherein step (b) comprises introducing counter streams of the water/graphite mixture using the at least two nozzles wherein the counter streams have substantially the same velocity and substantially the same pressure.

11. The method as defined in claim 7 which comprises a step (c) to dry the product of step (b).

12. The method as defined in claim 7 wherein the cavitation reactor has a cavitation chamber wherein the cavitation chamber has at least two offset inlet nozzles which are directed towards the centre of the cavitation chamber and at least one outlet.

\* \* \* \* \*